(12) United States Patent
Nam et al.

(10) Patent No.: US 10,873,994 B2
(45) Date of Patent: Dec. 22, 2020

(54) CO-AXIAL MULTI-ZONE INDUCTION COOKING APPARATUS

(71) Applicant: Haier US Appliance Solutions, Inc., Wilmington, DE (US)

(72) Inventors: Isaac Nam, Louisville, KY (US); William Hull Bicknell, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 608 days.

(21) Appl. No.: 15/657,287

(22) Filed: Jul. 24, 2017

(65) Prior Publication Data
US 2019/0029081 A1    Jan. 24, 2019

(51) Int. Cl.
*H05B 6/12*   (2006.01)
*H05B 6/06*   (2006.01)
*G05F 1/153*  (2006.01)

(52) U.S. Cl.
CPC .......... *H05B 6/1272* (2013.01); *G05F 1/153* (2013.01); *H05B 6/065* (2013.01); *H05B 2206/022* (2013.01)

(58) Field of Classification Search
CPC .... H05B 6/062; H05B 2213/05; H05B 6/065; H05B 6/1254; H05B 2206/022;
(Continued)

(56) References Cited

U.S. PATENT DOCUMENTS 5,319,174 A * 6/1994 Omori ............... H02M 7/53803
                                                       219/625
5,450,305 A * 9/1995 Boys ................. H02M 7/53803
                                                       363/24
(Continued)

FOREIGN PATENT DOCUMENTS

EP      2170010 B1    3/2015
JP    2008053056 A    3/2008
(Continued)

OTHER PUBLICATIONS

English translation of JP 4509061 B2 (Year: 2010).*

*Primary Examiner* — Ibrahime A Abraham
*Assistant Examiner* — Chris Q Liu
(74) *Attorney, Agent, or Firm* — Dority & Manning, P.A.

(57) ABSTRACT

An induction heating system with a plurality of resonant inverter tanks can be provided. The induction heating system can include a power source configured to supply power to the heating system and a plurality of parallel resonant inverter tanks in electrical connection with the power source. Each of the parallel resonant inverter tanks can include one or more parallel resonant capacitors, one or more parallel induction coils and one or more switches configured to disconnect each of the parallel resonant inverter tanks from the power source. The induction heating system can include a controller configured to perform operations, wherein the operations include determining when a cooking vessel is present at each induction coil and in response to determining that a cooking vessel is not present at a resonant inverter tank, operating the one or more switches such that the parallel resonant inverter tank is disconnected from the power source.

9 Claims, 5 Drawing Sheets

(58) Field of Classification Search
CPC ...... H05B 2213/07; H05B 3/746; H05B 6/06;
H05B 6/1245; H05B 6/1272; H05B 6/04;
H05B 6/1236; H05B 6/105; H05B
6/1209; H05B 6/1218; H05B 6/1281;
H05B 6/145; H05B 6/36; H05B 6/40;
H05B 6/44; H05B 6/62; H05B 6/685
USPC ............ 219/621, 624, 626, 664, 665, 447.1,
219/461.1, 465.1, 622, 625, 661, 662,
219/663, 448.11, 448.14, 448.16, 448.19,
219/492, 518, 607, 619, 620, 627, 634,
219/660, 702
See application file for complete search history.

(56) References Cited

U.S. PATENT DOCUMENTS

| | | | | |
|---|---|---|---|---|
| 2003/0010769 | A1* | 1/2003 | Wilde | H05B 3/746 |
| | | | | 219/448.19 |
| 2005/0109770 | A1* | 5/2005 | Esteras Duce | H05B 6/065 |
| | | | | 219/633 |
| 2012/0152935 | A1* | 6/2012 | Kitaizumi | H05B 6/065 |
| | | | | 219/661 |
| 2012/0305546 | A1* | 12/2012 | Filippa | H05B 6/062 |
| | | | | 219/660 |
| 2013/0200069 | A1* | 8/2013 | Kulp, Jr. | H05B 6/062 |
| | | | | 219/625 |
| 2014/0183183 | A1* | 7/2014 | Oh | H05B 6/065 |
| | | | | 219/662 |
| 2015/0250027 | A1* | 9/2015 | Takano | H05B 6/062 |
| | | | | 219/664 |
| 2016/0095168 | A1* | 3/2016 | Shan | H05B 6/062 |
| | | | | 219/626 |

FOREIGN PATENT DOCUMENTS

| | | |
|---|---|---|
| JP | 4509061 B2 | 7/2010 |
| WO | WO2016015971 A1 | 2/2016 |

* cited by examiner

CO-AXIAL MULTI-ZONE INDUCTION COOKING APPARATUS

FIELD

The present disclosure relates generally to induction cooking devices and systems for operating induction cooking devices.

BACKGROUND

Induction cooking appliances are more efficient, have greater temperature control precision and provide more uniform cooking than other conventional cooking appliances. In conventional cooktop systems, an electric or gas heat source is used to heat cookware in contact with the heat source. This type of cooking can be inefficient because only the portion of the cookware in contact with the heat source is directly heated. The rest of the cookware is heated through conduction that causes non-uniform cooking throughout the cookware. Heating through conduction takes an extended period of time to reach a desired temperature.

In contrast, induction cooking systems heat cookware by magnetic induction. Induction cooking systems typically include a coil positioned beneath a cooking surface on which the cookware item rests. In operation, an electric current flows through the coil such that the coil emits a magnetic field. The magnetic field induces a magnetic flux which repeatedly magnetizes the cookware item. The magnetic flux produces eddy currents within the ferromagnetic material that comprises the cookware item. The eddy currents heat the cookware item and a food item contained therein.

Induction cookers typically include a control panel having a display and one or more buttons. Through the use of the buttons, a user may manually select/adjust one or more cooking parameters, such as a cook time or a heating level. However, an optimal cook time can vary depending upon numerous factors, such as weight of the cookware and the food item therein. Selection of a cook time and/or heating level that is less than optimal may result in the food item being undercooked or overcooked. The size of cookware that can be utilized with induction cooking devices can also vary. In some induction cooking devices, when cookware is not present on one or more of a plurality of induction coils or when cookware is not present on a portion of an induction coil, this condition can result in H-field leakage and power loss can occur. When multiple induction coils are used as part of an induction cooking device, the magnetic fields for each of the induction coils can cancel each other out. These conditions can limit the type or selection of cookware available to the user and can result in an unpleasant or troublesome user experience.

Accordingly, multi-zone and zone-less induction cooking devices that can be controlled or activated based upon the size of the cookware being utilized with the induction cooking device and for controlling the activation and operation of multiple induction coils would be useful and welcomed.

BRIEF DESCRIPTION

Aspects and advantages of embodiments of the present disclosure will be set forth in part in the following description, or may be learned from the description, or may be learned through practice of the embodiments.

One example aspect of the present disclosure is directed to an induction heating system. The induction heating system includes a power source configured to supply power to the induction heating system. The induction heating system also includes a plurality of parallel resonant inverter tanks configured to be in electrical communication with the power source. Each of the parallel resonant inverter tanks include one or more parallel resonant capacitors, one or more parallel induction coils and one or more switches configured to disconnect each of the parallel resonant inverter tanks from the power source. The induction heating system can include a controller configured to perform operations. The operations can include determining whether a cooking vessel is present at each induction coil and in response to determining that a cooking vessel is present at a resonant inverter tank, operating the one or more switches such that the parallel resonant inverter tank is connected to the power source.

Another example aspect of the present disclosure is directed to a method of operating a plurality of induction heating coils in a cooktop. The method includes receiving power from a power source and distributing the power among a plurality of parallel resonant inverter tanks configured to be in electrical communication with the power source. Each of the parallel resonant inverter tanks include one or more parallel resonant capacitors, one or more parallel induction coils and one or more switches configured to disconnect each of the parallel resonant inverter tanks from the power source. The method includes determining, by one or more controllers, when a cooking vessel is present at each induction coil and performing operation in response to determining that a cooking vessel is not present at a resonant inverter tank. The operations include operating the one or more switches such that the parallel resonant inverter tank is disconnected from the power source.

Another example aspect of the present disclosure is directed to a cooking appliance having a co-axial induction cooktop. The co-axial cooktop includes a power source configured to supply power to the cooktop. The co-axial cooktop also includes a plurality of parallel resonant inverter tanks configured to be in electrical communication with the power supply. Each of the parallel resonant inverter tanks include one or more parallel resonant capacitors, one or more parallel induction coils and one or more switches configured to disconnect each of the parallel resonant inverter tanks from the power source. The cooking appliance also includes a controller configured to perform operations. The operations can include determining when a cooking vessel is present at each induction coil and in response to determining that a cooking vessel is not present at a resonant inverter tank, operating the one or more switches such that the parallel resonant inverter tank is disconnected from the power source.

Variations and modifications can be made to these example aspects of the present disclosure. These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
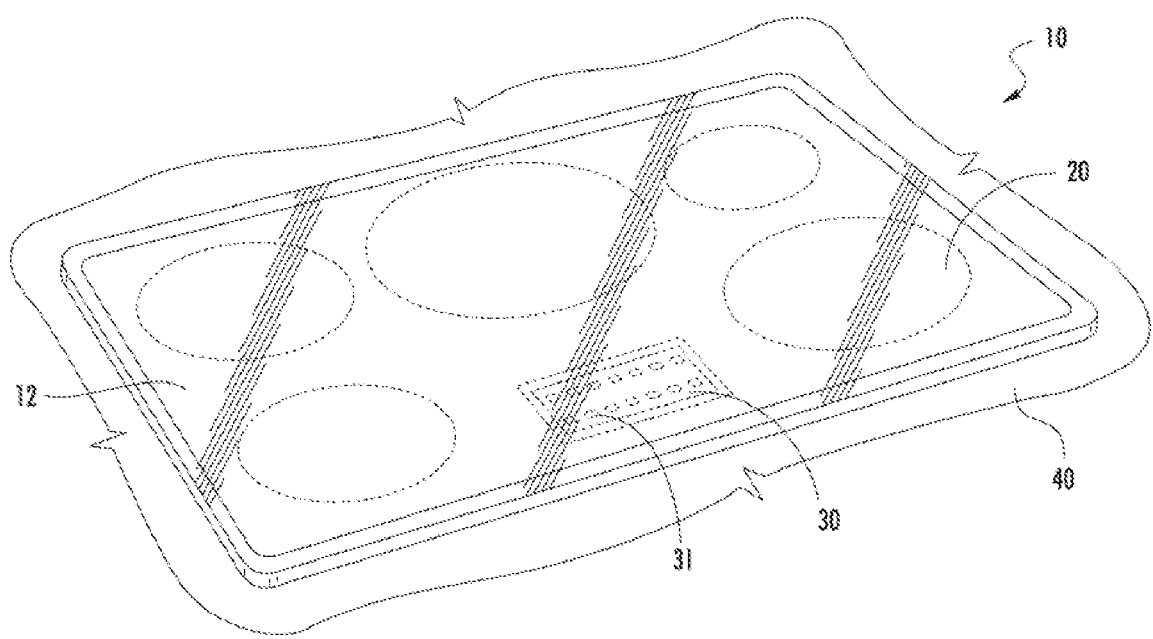
FIG. 1 depicts an example induction cooktop appliance according to example embodiments of the present disclosure.

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

Multi-zone or zone-less induction cooking systems can include multiple co-axial induction coils. Each of the co-axial coils can be included in a resonant tank circuit, which is created by a series and/or parallel configuration of an inductor, a capacitor, and a cooking vessel. Each tank circuit can be used to convert AC power provided to induction cooking system into a high-frequency, high current signal in the induction coil assembly to create induction heating used for cooking. Each tank circuit can be employed in or with a variety of inverter configurations. Each tank circuit can act as a passive band-pass filter to generate an alternating current signal exhibiting high amplitude. Induction cooking system can include one or more switching elements. The switching element can be a semiconductor device such as an Insulated Gate Bipolar Transistor (IGBT). The switching element can be connected in series and/or parallel with each resonant tank circuit. The switching element can be controlled to achieve a desired power output and for operating the inverter. The switching element can be controlled to connect or disconnect one or more co-axial induction coils.

Example aspects of the present disclosure are directed to circuit topologies for operating a multi-zone induction cooking system. As such, example aspects of the present disclosure are directed to multi-resonant tank circuit topologies for use with and control of multiple induction coils and induction cooking systems. In multi-zone or zone-less induction cooking, it is desirable to activate or excite only the induction coil or part of the induction coil that has a cooking vessel positioned adjacent to the induction coil. The reason for this operation is to avoid significant H-field leakage and to reduce power losses. The multi-resonant tank circuit topologies that are the subject of this disclosure are for use with and to control multiple induction coils or multi-zone induction coils. The multi-resonant tank circuit topologies that are the subject of this disclosure can provide for the selective operation of multi-zone induction coils or multiple co-axial coils based, at least in part, on the cookware that is being utilized with the induction cooking system.

In this way, example aspects of the present disclosure can provide a number of technical effects and benefits. For induction cooking devices, effective load can vary due to different types of pans and pots placed on the cooktop. Multiple co-axial coils can be utilized for multi-zone cooking and the circuit topology utilized with the co-axial coils can allow for selective control and operation of the co-axial coils or portions thereof. For example, a multi-zone cooking system can include an induction coil assembly that includes an inner coil, a first zone, and an outer coil, a second zone. The induction cooking system and induction coil assembly can be controlled such that the inner coil is activated when a cooking vessel of equivalent or nearly equivalent size to the inner coil is placed on the induction cooktop. The induction cooking system and induction coil assembly can be controlled such that the outer coil and inner coil are activated when a cooking vessel of equivalent or nearly equivalent size of the outer coil is placed on the induction cooktop. Such operation can increase power efficiency and provide a more pleasant and user-friendly experience.

Referring now to the figures, example aspects of the present disclosure will be discussed in greater detail.

FIG. 1 depicts induction cooktop 10 according to example embodiments of the present disclosure. Cooktop 10 can be installed in chassis 40 and in various configurations such as cabinetry in a kitchen, coupled with one or more ovens or as a stand-alone appliance. Chassis 40 can be grounded. Cooktop 10 includes a horizontal surface 12 that can be glass or other suitable material. Induction coil 20 can be provided below horizontal surface 12. It can be understood that cooktop 10 can include a single induction coil or a plurality of induction coils.

Cooktop 10 is provided by way of example only. The present disclosure can be used with other configurations. For example, a cooktop having one or more induction coils in combination with one or more electric or gas burner assemblies. In addition, the present disclosure can be used with a cooktop having a different number and/or positions of burners.

Cooktop 10 can include a user interface 30. User interface 30 can have various configurations and controls can be mounted in other configurations and locations other than as shown in the embodiment. In the illustrated embodiment, the user interface 30 can be located within a portion of the horizontal surface 12, as shown. Alternatively, the user interface can be positioned on a vertical surface near a front side of the cooktop 10 or other suitable location. The user interface 30 can include an input component 31. Input component 31 can be, for instance, a capacitive touch screen. The input component 31 can allow for the selective activation, adjustment or control of any or all induction coils 20 as well as any timer features or other user adjustable inputs. One or more of a variety of electrical, mechanical or electro-mechanical input devices, including rotary dials, push buttons, and touch pads, can also be used singularly or in combination as input component 31. The user interface 30 can include a display component, such as a digital or analog display device designed to provide operation feedback to a user.

Figure 2A:
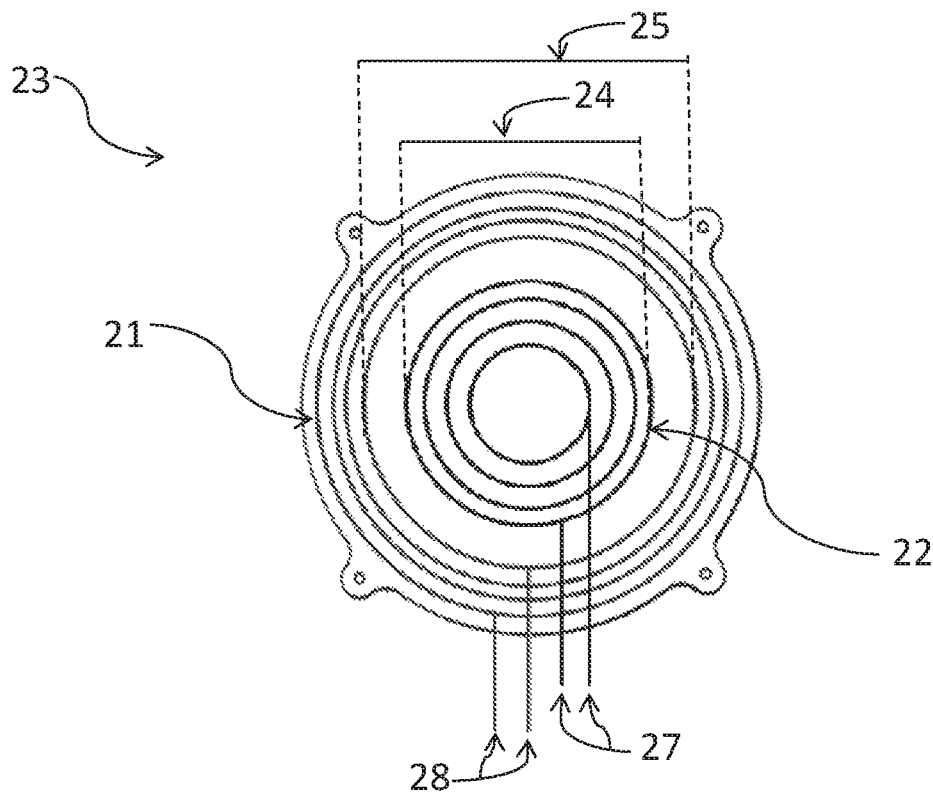
FIG. 2A depicts an example multi-zone co-axial induction coil for use in an induction heating system.

FIG. 2A depicts an example multi-zone co-axial induction coil 23 for use with an induction heating system, which could be used with cooktop 10 as induction coil 20 and which could be used with the circuit topologies for operating a multi-zone induction cooking system such as those depicted in FIGS. 4-7. Multi-zone co-axial induction coil 23 can include an outer coil 21. Multi-zone co-axial induction coil 23 can include and inner coil 22. Multi-zone co-axial induction coil 23 can be controlled such that the inner coil is activates (i.e., turns on) when a cooking vessel of nearly the same size of the inner coil 22 is placed on the cooktop 10. Multi-zone co-axial induction coil 23 can be controlled such that the outer coil 21 and inner coil 22 are activated (i.e., turn on) when a cooking vessel of nearly the same size of the outer coil 21 is placed on the cooktop 10. The inner coil has an outer diameter 24 which is not larger than the inner diameter 25 of the outer coil. In some embodiments, the controller will only activate the inner coil 22 when the diameter of the cooking vessel is not more than ten (10%) percent larger in diameter than the outer diameter 24 of the inner coil 22. In some embodiments, the controller will activate the inner coil 22 and outer coil 21 when the diameter of the cooking vessel is more than ten (10%) percent larger in diameter than the outer diameter 24 of the inner coil 22. Multi-zone co-axial induction coil 23 can include conductors 27 configured such that the inner coil 22 can be in electrical communication with the other components of the induction heating system, such as resonant inverter circuit 400. Multi-zone co-axial induction coil 23 can include conductors 28 configured such that the outer coil 21 can be in electrical communication with the other components of the induction heating system, such as resonant inverter circuit 400. In this example embodiment the multiple zones (e.g., outer coil 21 and inner coil 22) of multi-zone co-axial induction coil 23 can be configured as separate induction coils such that electrical power can be supplied (e.g., such as by operating one or more switches) to conductors 27 to activate (e.g., turn-on) inner coil 22 and electrical power can be supplied (e.g., such as by operating one or more switches) to conductors 28 to activate (e.g., turn-on) outer coil 21.

Figure 2B:
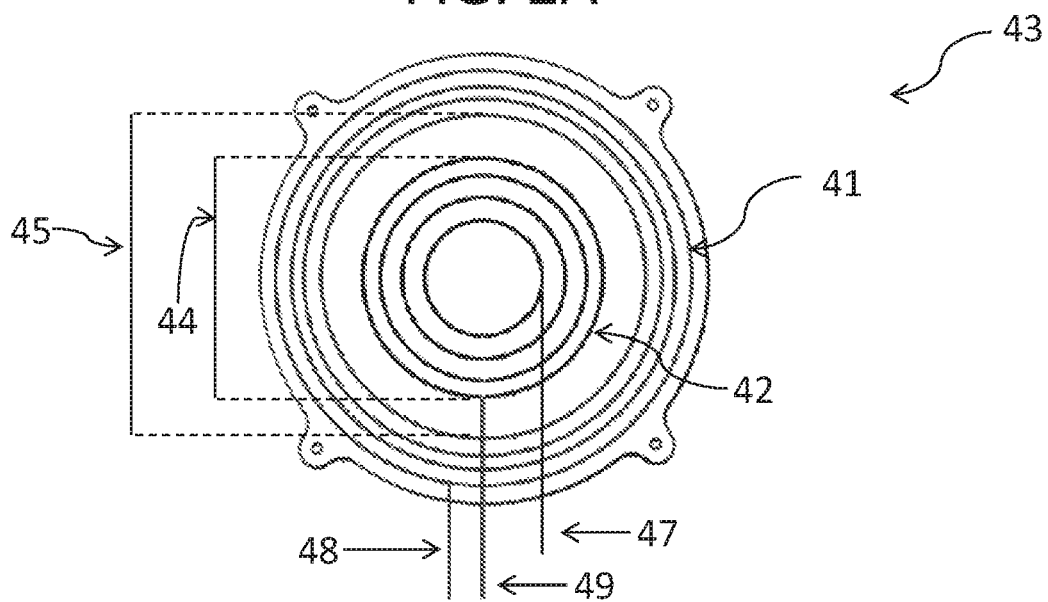
FIG. 2B depicts an example multi-zone co-axial induction coil for use in an induction heating system.

FIG. 2B depicts an example multi-zone co-axial induction coil 43 for use with an induction heating system, which could be used with cooktop 10 as induction coil 20 and which could be used with the circuit topologies for operating a multi-zone induction cooking system such as those depicted in FIGS. 4-7. Multi-zone co-axial induction coil 43 can include an outer coil 41. Multi-zone co-axial induction coil 43 can include and inner coil 42. Multi-zone co-axial induction coil 43 can be controlled such that the inner coil 42 is activates (i.e., turns on) when a cooking vessel of nearly the same size of the inner coil 42 is placed on the cooktop 10. Multi-zone co-axial induction coil 43 can be controlled such that the outer coil 41 and inner coil 42 are activated (i.e., turn on) when a cooking vessel of nearly the same size of the outer coil 41 is placed on the cooktop 10. The inner coil has an outer diameter 44 which is not larger than the inner diameter 45 of the outer coil 41. In some embodiments, the controller will only activate the inner coil 42 when the diameter of the cooking vessel is not more than ten (10%) percent larger in diameter than the outer diameter 44 of the inner coil 42. In some embodiments, the controller will activate the inner coil 42 and outer coil 41 when the diameter of the cooking vessel is more than ten (10%) percent larger in diameter than the outer diameter 44 of the inner coil 42. Multi-zone co-axial induction coil 43 can include conductors 47 configured such that the inner coil 42 can be in electrical communication with the other components of the induction heating system, such as resonant inverter circuit 400. Multi-zone co-axial induction coil 43 can include conductors (47, 48 and 49) configured such that the outer coil 41 and inner coil 42 can be in electrical communication with the other components of the induction heating system, such as resonant inverter circuit 400. Multi-zone co-axial induction coil 43 can be a single coil that includes multiple zones (e.g., outer coil 41 and inner coil 42) which are configured to be in electrical communication based at least in part on the electrical power that is supplied to conductors (47, 48 and 49) and the conductors are in electrical communication with multi-zone co-axial induction coil 43 in a tapped configuration. In the tapped configuration, electrical power can be supplied (e.g., such as by operating one or more switches) to conductor 47 and conductor 49 such that inner coil 42 is activated. Additionally, in the tapped configuration, the multiple zones (e.g., outer coil 41 and inner coil 42) of multi-zone co-axial induction coil 43 can be configured such that electrical power can be supplied (e.g., such as by operating one or more switches) to conductor 47 and conductor 49 to activate (e.g., turn-on) inner coil 42. Additionally, the multiple zones (e.g., outer coil 41 and inner coil 42) of multi-zone co-axial induction coil 43 can be configured such that electrical power can be supplied (e.g., such as by operating one or more switches) to conductor 47 and conductor 48 to activate (e.g., turn-on) outer coil 41 and inner coil 42.

Figure 3:
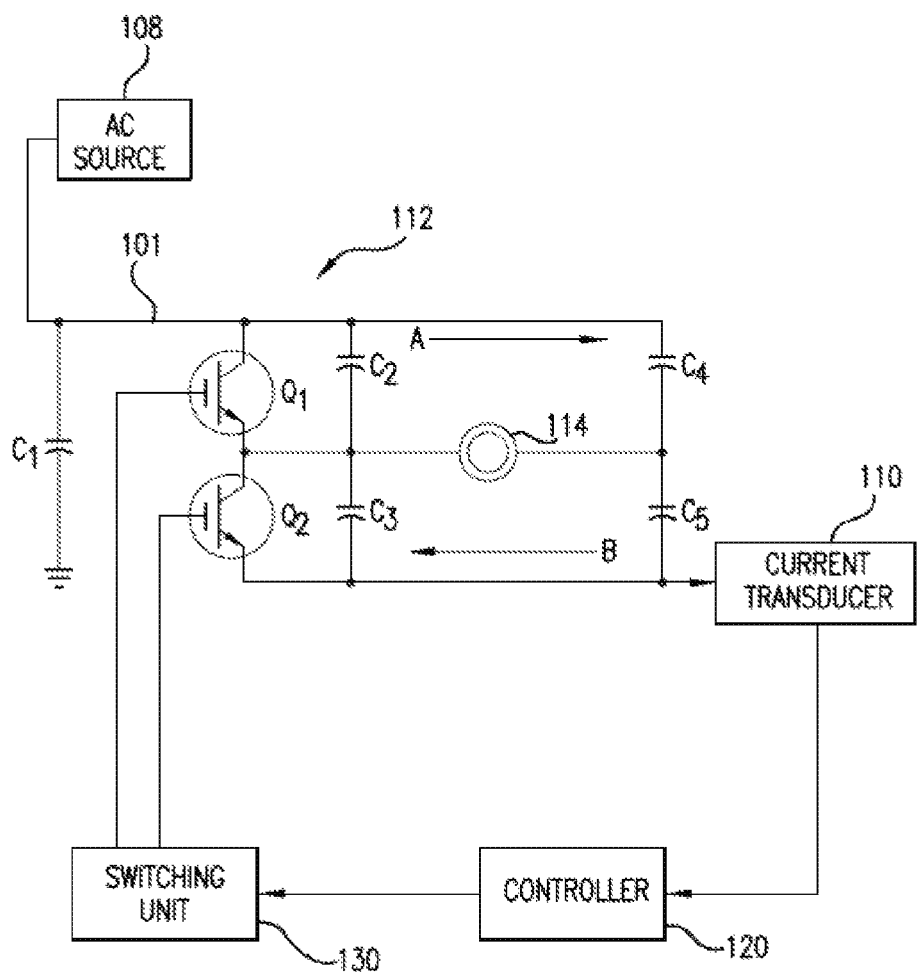
FIG. 3 depicts a diagram of an example resonant inverter for use in an induction heating system.

FIG. 3 depicts a circuit diagram of a typical resonant power inverter circuit. As shown, the induction heating coil 114 can receive a power signal 101 that is supplied through a resonant power inverter, referred to herein as a resonant inverter module 112. The resonant inverter module 112 can be generally configured to generate a high frequency power signal from AC power source 108 at a desired operating frequency to the induction heating coil 114. The load of the resonant inverter module 112 can generally include the induction heating coil 114 and any object or vessel that is present on the induction heating coil 114. The object or vessel on the induction heating coil 114, such as for example a pan, will be generally referred to herein as a vessel.

The resonant inverter module 112 can be coupled to AC power source 108. The resonant inverter module 112 can be provided with switching elements Q1 and Q2, which can provide power to the load, including the induction heating coil 114 and any vessel or object thereon. The direction A, B of the current flow through the induction heating coil 114 can be controlled by the switching of switching elements Q1 and Q2. Switching unit 130 can provide the controlled switching of the switching elements Q1, Q2 based on a switching control signal provided from controller 120. In typical known applications, controller 120 can be configured to control switching unit 130 based on signals from a current transducer or current transformer 110.

Switching elements Q1 and Q2 can be insulated-gate bipolar transistors (IGBTs) and the switching unit 130 can be a Pulse Width Modulation (PWM) controlled half bridge gate driver integrated circuit. In alternate embodiments, any suitable switching elements can be used, other than IGBTs. Snubber capacitors C2, C3 and resonant capacitors C4, C5 can be connected between a positive power terminal and a negative power terminal to successively resonate with the induction heating coil 114. The induction heating coil 114 can be connected between the switching elements Q1, Q2 and can induce an eddy current in the cooking vessel located on or near the induction heating coil 114. In particular, the generated resonant currents can induce a magnetic field coupled to the cooking vessel, inducing eddy currents in the vessel. The eddy currents can heat the vessel on the induction heating coil 114 as is generally understood in the art.

The resonant inverter module 112 can power the induction heating coil 114 with high frequency current. The switching of the switching elements Q1 and Q2 by switching unit 130 can control the direction A, B and frequency of this current. In one embodiment, this switching can occur at a switching frequency in a range that is between approximately 20 kHz and 50 kHz. When the cycle of the switching control signal from the switching unit 130 is at a high state, switching element Q1 can be switched ON and switching element Q2 can be switched OFF. When the cycle of the switching control signal is at a low state, switching element Q2 can be switched ON and switching element Q1 can be switched OFF. When switching element Q1 is triggered on, a positive voltage is applied to the resonant tank consisting of C4, C5 and the induction heating coil 114, and the current of the input power signal 101 flows through the induction heating coil 114 in the direction of B initially and then transitions to the A direction. When switching element Q2 is triggered on, a negative voltage is applied to the resonant tank, and the current of the input power signal 101 flows through the induction heating coil 114 in direction of A initially and then transitions to the B direction.

If switching element Q1 is turned on and switching element Q2 is turned off, the resonant capacitor C5 becomes in series with the parallel combination of the resonant capacitor C4 and the induction coil 114 (including any vessel thereon). This series-parallel configuration forms a resonant tank. If the switching element Q1 is turned off and switching element Q2 is turned on, the resonance capacitor C4 becomes in series with the parallel combination of the resonant capacitor C5 and the induction coil 114 (including any vessel thereon). This series-parallel configuration forms a resonant tank.

Figure 4:
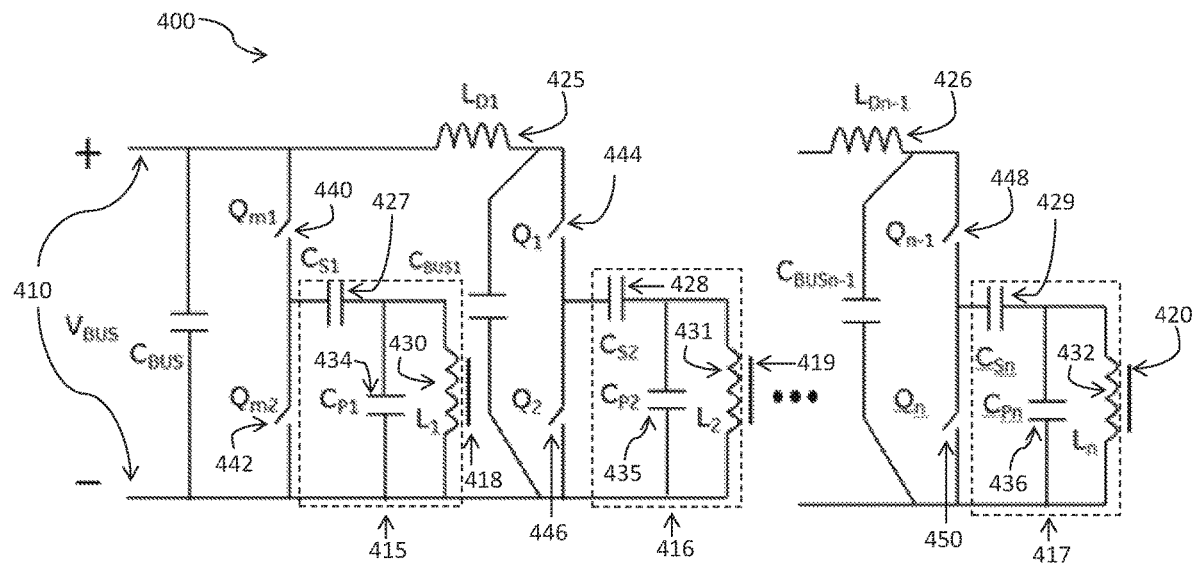
FIG. 4 depicts a diagram of an example resonant inverter circuit for use in an induction heating system according to example embodiments of the present disclosure.

FIG. 4 depicts a diagram of an example resonant inverter circuit 400 for use in an induction heating system according to example embodiments of the present disclosure. Resonant inverter circuit 400 includes a paralleled half-bridge configuration. Resonant tank circuits 415, 416 and 417 are attached in a parallel configuration. Resonant inverter circuit 400 is depicted for n resonant tank circuits, where n is the number of induction coils or zones of induction coils included with an induction cooking device. For example, an induction cooking device could include five coils and in this circuit, n would be five. Also, an induction cooking device could have one induction coil with two zones (e.g., an inner induction coil and an outer induction coil) and in this circuit, n would be two. Each resonant tank circuit includes a parallel configuration of induction coils 430, 431, 432 ($L_1$, $L_2$ and $L_n$), parallel resonant capacitors 433, 434 and 435 ($C_{P1}$, $C_{P2}$ and $C_{Pn}$) and series resonant capacitors 427, 428 and 429 ($C_{S1}$, $C_{S2}$ and $C_{Sn}$), which are in electrical communication with one or more loads. Loads, including 418, 419 and 420, can be cookware placed on a cooktop, such as cooktop 10. In some configurations, the parallel resonant capacitors ($C_{P1}$, $C_{P2}$ and $C_{Pn}$) may not be required based on the characteristics of resonance and impedance matching conditions. When the parallel resonant capacitors ($C_{P1}$, $C_{P2}$ and $C_{Pn}$) are not used in the resonant inverter circuit 400, the elements can be replaced with an open circuit. Resonant inverter circuit 400 can also include series elements such as AC decoupling inductors 425, 426 ($L_{D1}$ and $L_{Dn-1}$). Series resonant capacitors (427, 428 and 429) block the DC components of the resonant tank excitation signal that is provided by power supply 410 in order to avoid saturation of the ferromagnetic materials of the induction coils (430, 431 and 432) and avoid power losses due to DC resistances of the resonant tank circuits (415, 416 and 417). If saturation and power losses are at an acceptable level or not of concern in a particular application, the series elements or any combination of the series elements (series resonant capacitors 427, 428 and 429) can be replaced with a short circuit. In some embodiments and depending on applications, AC decoupling inductors 425, 426 ($L_{D1}$ and $L_{Dn-1}$) can be replaced with short circuits, and additional bus capacitors ($C_{BUS1}$ and $C_{BUSn-1}$) can be replaced with open circuits.

Resonant inverter circuit 400 can be in communication with one or more controllers, such as controller 120 in FIG. 3, which may generally include one or more processor(s) and associated memory configured to perform a variety of computer-implemented functions (e.g., performing the methods, steps, calculations and the like disclosed herein). By way of example, any/all of the "control devices" or "controllers" discussed in this disclosure can include a memory and one or more processing devices such as microprocessors, CPUs or the like, such as general or special purpose microprocessors operable to execute programming instructions or micro-control code associated with operation of the resonant inverter circuit, such as circuit 400, and the cooktop 10. The memory can represent random access memory such as DRAM, or read only memory such as ROM or FLASH. In one embodiment, the processor executes programming instructions stored in memory. The memory can be a separate component from the processor or can be included onboard within the processor. As used herein, the term "processor" refers not only to integrated circuits referred to in the art as being included in a computer, but also refers to a controller, microcontroller, a microcomputer, a programmable logic controller (PLC), an application specific integrated circuit (ASIC), and other programmable circuits. Additionally, the memory may generally include memory element(s) including, but not limited to, a computer readable medium (e.g., random access memory (RAM)), computer readable non-volatile medium (e.g., flash memory) and/or other suitable memory elements.

Resonant inverter circuit 400 can include a plurality of switches denoted as "Q" in FIG. 4. The switches may be MOSFETs, IGBTs, relays, BJTs or other known switching devices. Switches are used to selectively activate, connect or remove the resonant tank circuits 415, 416 and 417. For example, a first switch 440 and a second switch 442 can be associated with resonant tank circuit 415. One or more controllers, such as controller 120 in FIG. 3, can control the operation of the switches including first switch 440 and second switch 442. When controller determines that a cooking vessel is placed in a manner adjacent to induction coil 430, controller can operate (e.g., turn on and turn off) first switch 440 and second switch 442, to operate resonant tank circuit 415. For example, when a cooking vessel is present at induction coil 430, controller will operate (e.g., turn on and turn off) first switch 440 and second switch 442 such that current flows through induction coil 430 at a frequency to create induction heating used for cooking at induction coil 430. When a cooking vessel is not present at induction coil 430, controller will control the operation of first switch 440 such that current does not flow through induction coil 430 for cooking and first switch 440 and second switch 442 remains open (e.g., off).

Switches 444 and 446 can be associated with resonant tank 416 and controller can control the operation of switches 444 and 446 and resonant tank 416 at a frequency to create induction heating used for cooking at induction coil 431 based on whether a cooking vessel is present at induction coil 431. Similarly, switches 448 and 450 can be associated with resonant tank 417 and controller can control the operation of switches 448 and 450 and resonant tank 417 at a frequency to create induction heating used for cooking at induction coil 432 based on whether a cooking vessel is present at induction coil 432.

Figure 5:
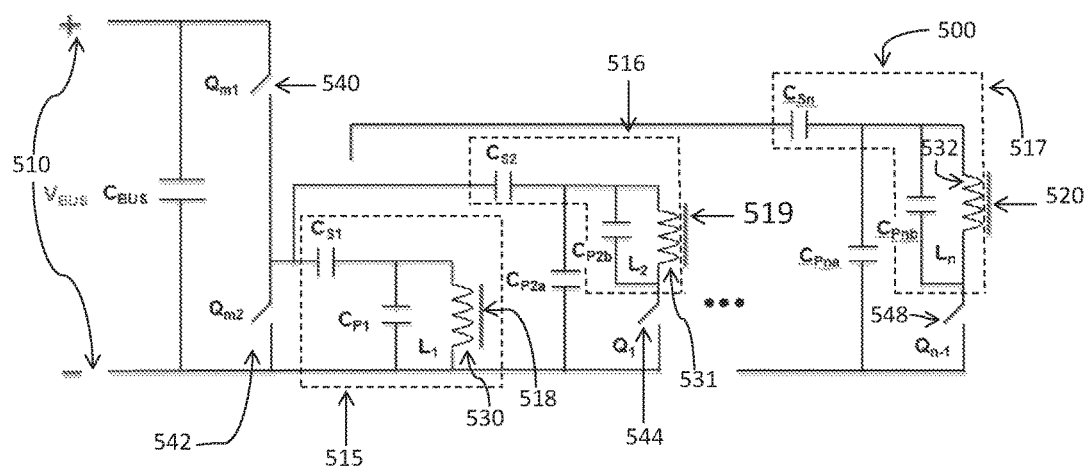
FIG. 5 depicts a diagram of an example resonant inverter circuit for use in an induction heating system according to example embodiments of the present disclosure.

FIG. 5 depicts a diagram of an example resonant inverter circuit 500 for use in an induction heating system according to example embodiments of the present disclosure. Resonant inverter circuit 500 includes a parallel resonant tank configuration. Resonant tank circuits 515, 516 and 517 are attached in a parallel configuration. Resonant inverter circuit 500 is depicted for n resonant tank circuits, where n is the number of induction coils or zones of induction coils included with an induction cooking device. For example, an induction cooking device could include five coils and in this circuit, n would be five. Also, an induction cooking device could have one induction coil with two zones and in this circuit, n would be two. Each resonant tank circuit includes a parallel configuration of induction coils 530, 531, 532 ($L_1$, $L_2$ and $L_n$), parallel resonant capacitors ($C_{P1}$, $C_{P2}$ and $C_{Pn}$) and series resonant capacitors ($C_{S1}$, $C_{S2}$ and $C_{Sn}$), which are in electrical communication with one or more loads 5 Loads, including 518, 519 and 520, can be cookware placed on a cooktop, such as cooktop 10. In some configurations, the parallel resonant capacitors ($C_{P1}$, $C_{P2a}$, $C_{Pna}$, $C_{P2b}$, and $C_{Pnb}$) may not be required based on the characteristics of resonance and impedance matching. When the parallel resonant capacitors ($C_{P1}$, $C_{P2a}$, $C_{Pna}$, $C_{P2b}$ and $C_{Pnb}$) are not used in the resonant inverter circuit 500, the elements can be replaced with an open circuit. Resonant inverter circuit 500 includes series resonant capacitors ($C_{S1}$, $C_{S2}$ and $C_{Sn}$). Series resonant capacitors ($C_{S1}$, $C_{S2}$ and $C_{Sn}$) block the DC components of the resonant tank excitation signal that is provided by power supply 510 in order to avoid saturation of the ferromagnetic materials of the induction coils (530, 531 and 532) and avoid power losses due to DC resistances of the resonant tank circuits (515, 516 and 517). If saturation and power losses are at an acceptable level or not of concern with a particular application the series elements or any combination of the series elements (series resonant capacitors, $C_{S1}$, $C_{S2}$ and $C_{Sn}$) can be replaced with a short circuit.

Resonant inverter circuit 500 can be in communication with one or more controllers, such as controller 120 in FIG. 3, which may generally include one or more processor(s) and associated memory configured to perform a variety of computer-implemented functions (e.g., performing the methods, steps, calculations and the like disclosed herein). Resonant inverter circuit 500 can include a plurality of denoted a "Q" in FIG. 5. The switches may be MOSFETs, IGBTs, relays, BJTs or other known switching devices. Switches are used to selectively activate, connect or remove the resonant tank circuits 515, 516 and 517. For example, a first switch 540 and a second switch 542 can be associated with resonant tank circuit 515. One or more controllers, such as controller 120 in FIG. 3, can control the operation of the switches including first switch 540 and second switch 542. When controller determines that a cooking vessel is placed in a manner adjacent to induction coil 530, controller can operate (e.g., turn on and turn off) first switch 540 and second switch 542, to operate resonant tank circuit 515. For example, when a cooking vessel is present at induction coil 530, controller will operate (e.g., turn on and turn off) first switch 540 and second switch 542 such that current flows through induction coil 530 at a frequency to create induction heating used for cooking at induction coil 530. When a cooking vessel is not present at induction coil 530, controller will control the operation of first switch 540 such that current does not flow through induction coil 430 for cooking and first switch 540 and second switch 542 remains open (e.g., off).

Switch 544 can be associated with resonant tank 516 and controller can control the operation of switches 540 and 544 and resonant tank 516 at a frequency to create induction heating used for cooking at induction coil 531 based on whether a cooking vessel is present at induction coil 531. Similarly, switch 548 can be associated with resonant tank 517 and controller can control the operation of switches 548 and 540 and resonant tank 517 at a frequency to create induction heating used for cooking at induction coil 520 based on whether a cooking vessel is present at induction coil 520.

Figure 6:
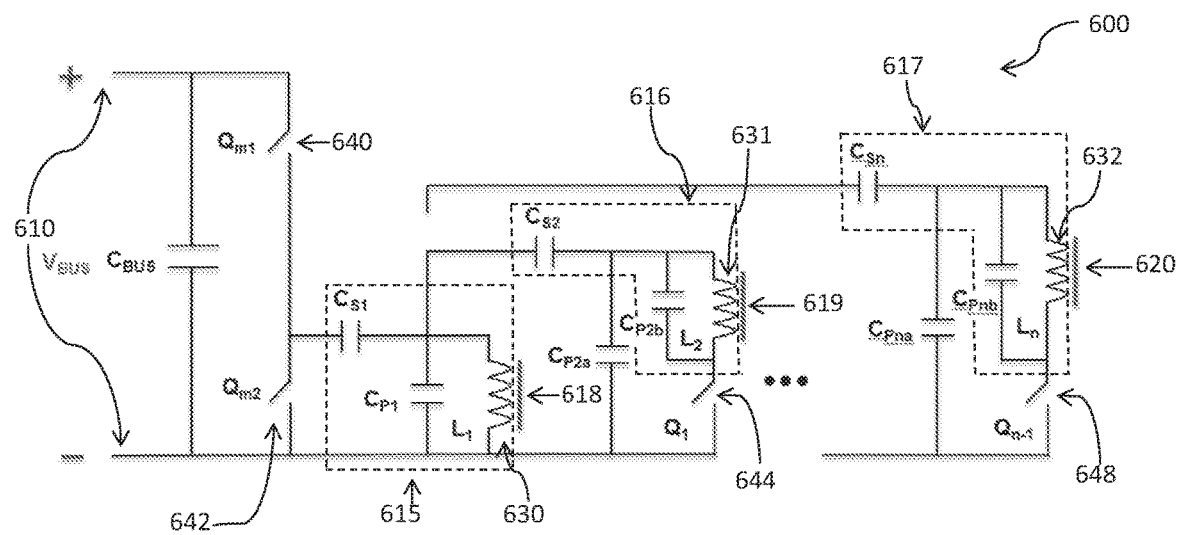
FIG. 6 depicts a diagram of an example resonant inverter circuit for use in an induction heating system according to example embodiments of the present disclosure.

FIG. 6 depicts a diagram of an example resonant inverter circuit 600 for use in an induction heating system according to example embodiments of the present disclosure. Resonant inverter circuit 600 includes a parallel resonant tank configuration. Resonant tank circuits 615, 616 and 617 are attached in a parallel configuration. Resonant inverter circuit 600 is depicted for n resonant tank circuits, where n is the number of induction coils or zones of induction coils included with an induction cooking device. For example, an induction cooking device with could include five coils and in this circuit, n would be five. Also, an induction cooking device could have one induction coil with two zones and in this circuit, n would be two. Each resonant tank circuit includes a parallel configuration of induction coils 630, 631, 632 ($L_1$, $L_2$ and $L_n$), parallel resonant capacitors ($C_{P1}$, $C_{P2}$ and $C_{Pn}$) and series resonant capacitors ($C_{S1}$, $C_{S2}$ and $C_{Sn}$), which are in electrical communication with one or more loads. Load, including 618, 619 and 620, can be cookware placed on a cooktop, such as cooktop 10. In some configurations, the parallel resonant capacitors ($C_{P1}$, $C_{P2b}$ and $C_{Pnb}$) may not be required based on the characteristics of resonance and impedance matching. When the parallel resonant capacitors ($C_{P1}$, $C_{P2b}$ and $C_{Pnb}$) are not used in the resonant inverter circuit 600, the elements can be replaced with an open circuit. Resonant inverter circuit 600 includes series resonant capacitors ($C_{S1}$, $C_{S2}$ and $C_{Sn}$). Series resonant capacitors ($C_{S1}$, $C_{S2}$ and $C_{Sn}$) block the DC components of the resonant tank excitation signal that is provided by power supply 610 in order to avoid saturation of the ferromagnetic materials of the induction coils (630, 631 and 632) and avoid power losses due to DC resistances of the resonant tank circuits (615, 616 and 617). If saturation and power losses are at an acceptable level or not of concern with a particular application the series elements or any combination of the series elements (series resonant capacitors, $C_{S1}$, $C_{S2}$ and $C_{Sn}$) can be replaced with a short circuit.

Resonant inverter circuit 600 can be in communication with one or more controllers, such as controller 120 in FIG. 3, which may generally include one or more processor(s) and associated memory configured to perform a variety of computer-implemented functions (e.g., performing the methods, steps, calculations and the like disclosed herein). Resonant inverter circuit 500 can include a plurality of denoted a "Q" in FIG. 6. The switches may be MOSFETs, IGBTs, relays BJTs or other known switching devices. Switches are used to selectively activate, connect or remove the resonant tank circuits 615, 616 and 617. For example, a first switch 640 and a second switch 642 can be associated with resonant tank circuit 615. One or more controllers, such as controller 120 in FIG. 3, can control the operation of the switches including first main switch 640 and second main switch 642. When controller determines that a cooking vessel is placed in a manner adjacent to induction coil 630, controller can operate (e.g., turn on and turn off) first switch 640 and second switch 642, to operate resonant tank circuit 615. For example, when a cooking vessel is present at induction coil 630, controller will operate (e.g., turn on and turn off) first switch 640 and second switch 642 such that current flows through induction coil 630 at a frequency to create induction heating used for cooking at induction coil 630. When a cooking vessel is not present at induction coil 630, controller will control the operation of first switch 540 such that current does not flow through induction coil 630 for cooking and first switch 640 and second switch 562 remains open (e.g., off).

Resonant tank switch 644 can be associated with resonant tank 616 and controller can control the operation of switches 640 and 644 and resonant tank 616 at a frequency to create induction heating used for cooking at induction coil 631 based on whether a cooking vessel is present at induction coil 631. Similarly, switch 648 can be associated with resonant tank 617 and controller can control the operation of switches 648 and 640 and resonant tank 617 at a frequency to create induction heating used for cooking at induction coil 620 based on whether a cooking vessel is present at induction coil 620.

Figure 7:
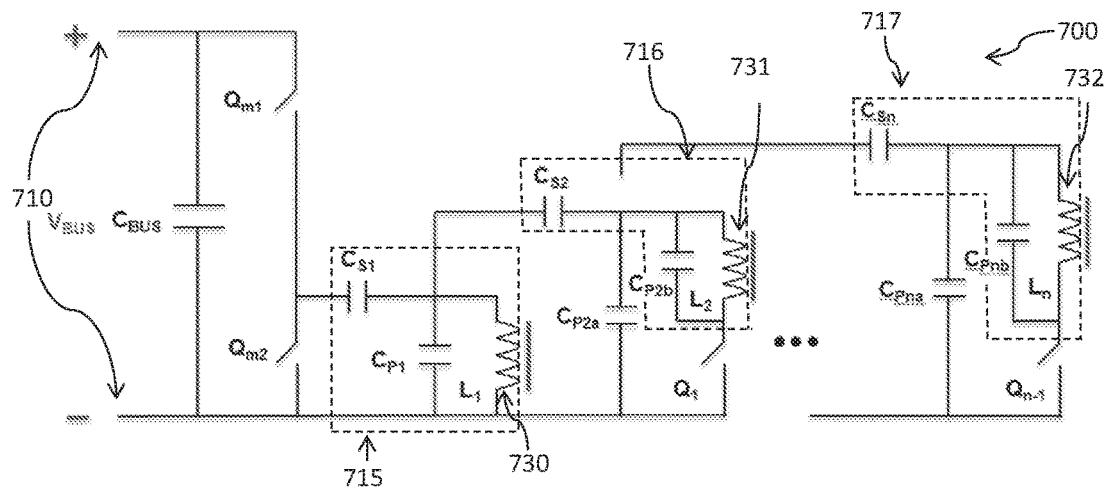
FIG. 7 depicts a diagram of an example resonant inverter circuit for use in an induction heating system according to example embodiments of the present disclosure.

FIG. 7 depicts a diagram of an example resonant inverter circuit 700 for use in an induction heating system according to example embodiments of the present disclosure. Resonant inverter circuit 700 includes a parallel resonant tank configuration. Resonant inverter circuit 700 includes switching components which operate in the same manner as described with regarding to resonant inverter circuit 600 in FIG. 6. Similar to the resonant inverter circuit 600, resonant inverter circuit 700 includes series resonant capacitors ($C_{S1}$, $C_{S2}$ and $C_{Sn}$). The series resonant capacitor ($C_{S1}$) blocks the DC components of the resonant tank excitation signal that is provided by power supply 710 in order to avoid saturation of the ferromagnetic materials of the induction coils (730, 731 and 732) and avoid power losses due to DC resistances of the resonant tank circuits (715, 716 and 717). If saturation and power losses are at an acceptable level or not of concern with a particular application the series elements or any combination of the series elements (series resonant capacitors, $C_{S1}$, $C_{S2}$ and $C_{Sn}$) can be replaced with a short circuit.

In each of the resonant inverter circuits shown in FIGS. 4, 5, 6 and 7, the currents in each of the co-axial induction coils should be in phase or nearly in phase. If the coil currents are out of phase, some or all magnetic fields can cancel each other depending on the degree of phase shift. Therefore, each of the resonant tank circuits needs to be designed such that the coil currents of the resonant tanks circuits are synchronized or nearly synchronized. In order to determine resonant tank parameters, a frequency domain analysis can be performed. For example, in order to determine parallel resonant capacitance for a given operating frequency and a coupled induction coil's reflected inductance and effective resistance, the following equation can be utilized:

$$C_{pn} = \frac{R_{ref}(C_{S\_ref} + C_{p\_ref})}{R_n[1 - \omega^2 L_{ref}(C_{S\_ref} + C_{p\_ref})] + \omega^2 L_n R_{ref}(C_{S\_ref} + C_{p\_ref})} - C_{S\_ref}$$

Using this equation and fixing the value of all series resonant capacitors (i.e., $C_{S1}$, $C_{S2}$ and $C_{Sn}$) to a fixed value ($C_{S\_ref}$), to for instance 0.6 (μF), provides the required relationship for obtaining the same phase for all of the induction coil currents. For example, if the resonant inverter circuit included three resonant tanks circuits and the parameters of the second resonant tank circuit was chosen as the fixed reference values (i.e., ref values) the appropriate parallel capacitors for resonant tanks 1 and 3 can be calculated using the above equation. The equation allows for the determination of capacitances that would provide impedance conditions required for obtaining approximately the same phase for each of the resonant tanks. In this equation $$\omega = \frac{2\pi}{T} = 2\pi f$$

where T is time associated with a single period of the resonant tank excitation signal that is provided by inverter switching and f is the operating frequency of the resonant tank excitation signal and is the inverter switching frequency. For example, if the parameters of the second tank were as follows and chosen as the fixed reference values (i.e., ref values):

|  | Cs (μF) | Cp (μF) | L (μH) | R (Ω) |
| --- | --- | --- | --- | --- |
| Resonant Tank 2 | 0.68 | 0.68 | 50 | 2.7 |

Utilizing the equation noted above would allow for the calculation and determination of the impedance conditions required for obtaining approximately the same phases for each of resonant tanks 1 and 3. Those impedance conditions would be as follows:

|  | Cs (μF) | Cp (μF) | L (μH) | R (Ω) |
| --- | --- | --- | --- | --- |
| Resonant Tank 1 | 0.68 | 0.2964 | 60 | 2 |
| Resonant Tank 2 | 0.68 | 0.68 | 50 | 2.7 |
| Resonant Tank 3 | 0.68 | 2.072 | 30 | 2.3 |

Although specific features of various embodiments may be shown in some drawings and not in others, this is for convenience only. In accordance with the principles of the present disclosure, any feature of a drawing can be referenced and/or claimed in combination with any feature of any other drawing.

This written description uses examples for the disclosure, including the best mode, and also to enable any person skilled in the art to practice the disclosure, including making and using any devices or systems and performing any incorporated methods. The patentable scope of the disclosure is defined by the claims, and can include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An induction heating system, the induction heating system comprising:
a power source configured to supply power to the induction heating system;
a plurality of parallel resonant inverter tanks configured to be in electrical communication with the power source, wherein each of the parallel resonant inverter tanks include one or more resonant capacitors, one or more induction coils and one or more switches configured to disconnect each of the parallel resonant inverter tanks from the power source, wherein the one or more induction coils comprise one or more outer coils and one or more inner coils respectively;

a controller configured to perform operations, wherein the operations include determining whether a cooking vessel with a diameter more than 10% greater than an outer diameter of the one or more inner coils is present at one of the one or more induction coils, and in response to determining that a cooking vessel is present at a resonant inverter tank, operating the one or more switches such that the parallel resonant inverter tank is connected to the power source.

2. The induction heating system of claim 1, wherein a capacitance of each of the one or more resonant capacitors is such that the current flowing through each induction coil is equivalent.

3. The induction heating system of claim 1, wherein each parallel resonant inverter tank is configured as a half-bridge inverter.

4. The induction heating system of claim 3, wherein the induction heating system further comprises one or more series capacitors.

5. The induction heating system of claim 3, wherein the induction heating system further comprises one or more AC decoupling inductors.

6. The induction heating system of claim 4, wherein each resonant inverter tank is configured to be in electrical communication at a node such that each parallel resonant inverter tank is controlled by a first main switch and one or more secondary switches.

7. The induction heating system of claim 4, wherein the parallel resonant inverter tanks are configured to be in electrical communication at a node point that is positioned such that a first series resonant capacitor is in electrical communication with each resonant inverter tank.

8. The induction heating system of claim 4, wherein at least two of the parallel resonant inverter tanks are configured such that a first induction coil has an outer diameter which is less than an inner diameter of a second induction coil and the first induction coil is disposed within the inner diameter of the second induction coil.

9. The induction heating system of claim 8, wherein the controller is further configured to operate the first and second induction coils based, at least in part, on the size of the cooking vessel.

* * * * *